United States Patent

[11] 3,619,708

[72] Inventors Earl M. Stetson;
Thomas J. Carpenter, both of Pittsfield, Mass.
[21] Appl. No. 2,147
[22] Filed Jan. 12, 1970
[45] Patented Nov. 9, 1971
[73] Assignee General Electric Company

[54] SURGE VOLTAGE ARRESTER ASSEMBLY HAVING INTEGRAL CAPACITOR MOUNTING AND CONNECTING MEANS
16 Claims, 6 Drawing Figs.
[52] U.S. Cl. .................................................. 315/36,
315/59, 313/231.1, 317/61
[51] Int. Cl. ...................................................... H02h 7/24,
H02h 9/06
[50] Field of Search ........................................... 315/36, 59;
313/231, 231.1; 317/61

[56] References Cited
UNITED STATES PATENTS

| 3,152,279 | 10/1964 | Misare............................ | 315/36 X |
| 3,106,661 | 10/1963 | Burrage et al. .............. | 315/231 X |
| 2,890,383 | 6/1969 | Olsen ............................ | 315/59 X |
| 3,524,099 | 7/1970 | Stetson......................... | 315/36 |

FOREIGN PATENTS

| 209,213 | 7/1957 | Australia..................... | 313/231.1 |

Primary Examiner—Herman Karl Saalbach
Assistant Examiner—Saxfield Chatmon, Jr.
Attorneys—Vale P. Myles, Francis X. Doyle, Frank L. Neuhauser, Oscar B. Waddell and Joseph B. Forman ABSTRACT: A sparkgap assembly for a low-voltage lightning arrester is provided with a sparkgap-shunting capacitor mounting and connecting means that is an integral part of the sparkgap assembly. The integral capacitor mounting and connecting means comprises a highly reliable yet economically manufactured arrangement that is well adapted to mass production techniques for making lightning arresters.

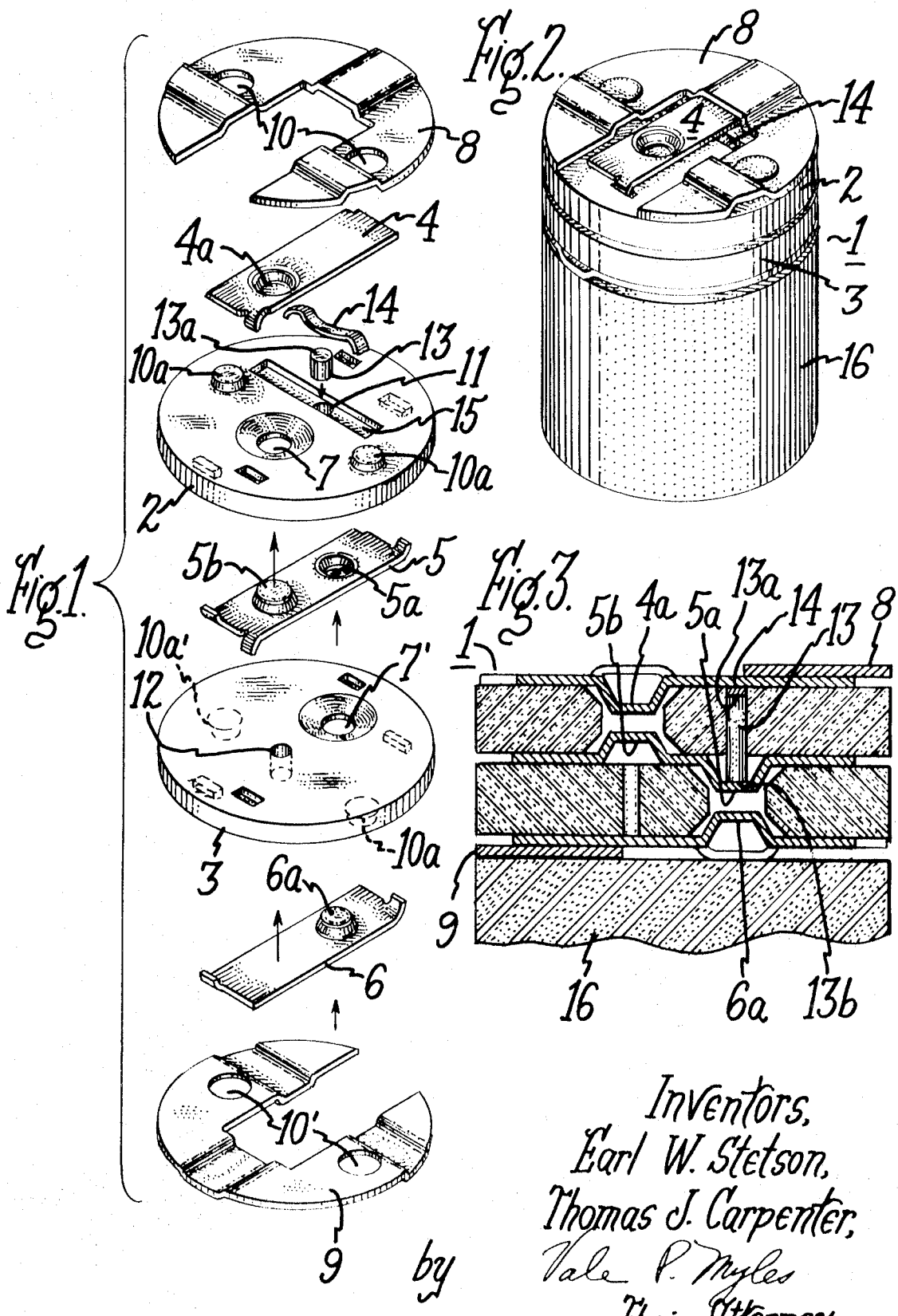

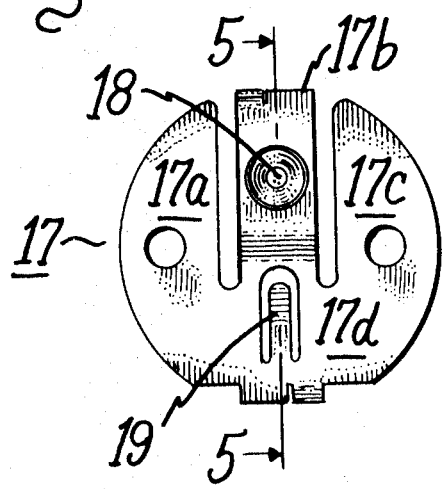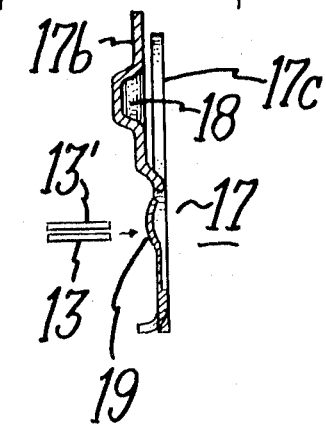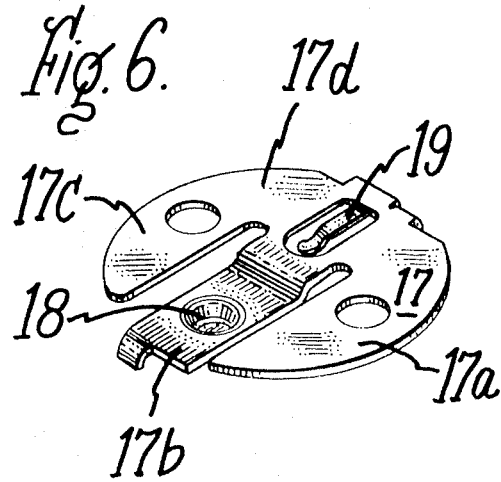

SURGE VOLTAGE ARRESTER ASSEMBLY HAVING INTEGRAL CAPACITOR MOUNTING AND CONNECTING MEANS

It is known in the prior art to shunt connect a capacitor across one or more of the sparkgaps in a multigap sparkgap assembly in order to effectively short circuit the shunted gaps when on overvoltage, high-frequency surge is initially impressed across the assembly. Such "upsetting" of the sparkgap assembly voltage distribution causes a disproportionately high voltage to be applied across the remaining, unshunted gaps of the assembly and thereby forces these gaps to breakdown and sparkover at a relatively lower voltage than the sparkover voltage rating of the assembly without such capacitance upsetting. A major advantage of upsetting circuits for sparkgap assemblies is that a lower sparkover voltage can be obtained for a given arrester rating.

It has been common practice in prior art sparkgap assemblies to mount upsetting capacitors adjacent the outer surface of the assembly housing and to connect the respective capacitor terminals in shunt with the assembly's sparkgaps by soldering wire leads thereto, or by mechanically fastening conductive wires or bands to the respective electrode forming the shunted sparkgap. Although such mounting and connecting arrangements are relatively expensive and require substantial free space within the housing for a sparkgap assembly, these problems have not prevented the use of such circuits in high-voltage station lightning arresters where adequate space exists within the lightning arrester housing for such capacitors and wherein the relative expense of such connectors is a small factor in the overall cost of manufacturing these arresters. However, heretofor the prior art mounting and connecting means for shunting capacitors have precluded their use in relatively inexpensive, compactly built low-voltage distribution lightning arresters.

In one preferred form of our invention, a sparkgap assembly is provided for a low-voltage distribution type of lightning arrester that is characterized by incorporating a sparkgap-shunting, upsetting capacitor that is operative to reduce the sparkover voltage of the assembly when a high-voltage surge is impressed across it. The capacitor is mounted within the sparkgap assembly and forms an integral part of this assembly so that additional space is not required within an arrester housing for the assembly to accommodate the capacitor. Also, unique means are provided for economically and reliably affording an electrical connection between the respective terminals of the capacitor and the electrodes forming the shunted sparkgap of the assembly.

A primary object of our invention is to provide a sparkgap assembly for a low-voltage distribution lightning arrester that is less expensive to manufacture than prior art distribution lightning arresters and at the same time possesses superior operating characteristics.

Another object of the invention is to provide a reliable and inexpensive capacitor mounting arrangement and connecting circuit for shunting a capacitor across predetermined electrodes of a sparkgap of a sparkgap assembly.

A further object of the invention is to provide a capacitance mounting and connecting arrangement for a sparkgap assembly that can be economically produced on a mass production basis.

Yet another object of the invention is to provide a capacitance mounting arrangement for a sparkgap assembly in which the sparkgap forming electrodes of the assembly serve to support the capacitor in a predetermined operating position.

A still further object of the invention is to provide a capacitor mounting and connecting means for a sparkgap assembly that facilitates easy adjustment of capacitance valves without requiring any soldering or cutting operations to make such changes.

Further objects and advantages of the invention will become apparent from the description that follows taken in conjunction with the drawings appended hereto in which:

FIG. 1 is an exploded perspective view of the component parts of a sparkgap assembly and capacitance voltage distributing arrangement constructed pursuant to the teachings of our invention.

FIG. 2 is a perspective view showing the component parts of the sparkgap assembly illustrated in FIG. 1 in their assembled, operative position mounted on a block of nonlinear resistance valve material.

FIG. 3 is a side elevation, cross-sectional view of the sparkgap assembly and nonlinear valve block depicted in FIG. 2.

FIG. 4 is a top plan view of a sparkgap electrode and capacitance connecting and supporting means, constructed pursuant to our invention, that can be utilized with a sparkgap assembly of the type illustrated in FIGS. 1–3.

FIG. 5 is a side elevation, cross-sectional view along the plane 5—5 of the sparkgap electrode and capacitor supporting and connecting member illustrated in FIG. 4.

FIG. 6 is a perspective view of the electrode member depicted in FIGS. 4 and 5.

Referring now to FIGS. 1 and 2 of the drawing, there is shown a sparkgap assembly 1 comprising a plurality of stacked insulating plate members 2 and 3 and a plurality of generally flat, elongated sparkgap electrodes 4, 5 and 6. The two end electrodes 4 and 6 are provided with integral cup-shaped terminal portions 4a and 6a, respectively, while intermediate electrode 5 has a pair of such cup-shaped terminal portions 5a and 5b extending in opposite directions from its generally flat body portion. Each of the insulating plate members 2 and 3 are provided with apertures 7 and 7', respectively, therethrough. When these component parts are assembled in operative position, as shown in FIG. 2, the cup-shaped terminal portions of electrodes 4–6 extend partially into the apertures 7 and 7' to form sparkgaps therein with the terminal portions of electrode 5 as is perhaps best seen in FIG. 3 of the drawing. Thus, a sparkgap 4a–5b is formed between terminal portions 4a and 5b of electrodes 4 and 5, while a second sparkgap 5a–6a is formed between the cup-shaped terminal portions 5a and 6a of electrodes 5 and 6, respectively.

It will be appreciated by those skilled in the art that various means may be utilized for making terminal connections to the end electrodes 4 and 6 of sparkgap assembly 1; however, in the embodiment of the invention depicted in FIGS. 1 and 2 a pair of end terminal plates 8 and 9 are mounted over the end electrodes 4 and 6 so that the base portions of the terminal plates 8 and 9 are in electrical contact with the respective ends of electrodes 4 and 6 remote from their sparkgap-forming terminal portions 4a and 6a. The leg portions of terminal plates 8 and 9 are provided with positioning apertures 10 and 10' respectively that cooperate with preformed abutments 10a and 10a' *on the top and bottom surfaces, respectively, of insulating plate members 2 and 3 to retain terminal plate members 8 and 9 in operative position when these component parts are assembled as shown in FIG. 2.*

The sparkgap components described thus far are similar to structural arrangements already known in the lightning arrester sparkgap art, at least to the extent indicated in a copending U.S. Pat. application Ser. No. 886,102, filed Dec. 18, 1969 by Stetson et al. and assigned to the assignee of the present invention.

Further examination of the structures shown in FIG. 1 and FIG. 3 will reveal that both of the insulating plate members 2 and 3 are provided with passageways 11 and 12, respectively, therethrough. As will become apparent from the following description, the passageway 12 is not necessary to the operation of the embodiment of our invention described with reference to FIGS. 1–3; however, it has been found that there are substantial economies to be realized from standardizing the configuration of insulating plate members 2 and 3 by providing such passageways (12) in each of them, and these passageways do not impair the proper operating functions of sparkgap assembly 1. Moreover, by providing passageways, like passageway 12, in each plate member it is possible to shunt any desired number of sparkgaps in the assembly.

When sparkgap assembly 1 has its components arranged in operative position, as shown in FIG. 3, a cylindrically shaped capacitor 13 is mounted within the passageway 11 and rests on the inner surface of cup-shaped terminal 5a. In order to facilitate a description of our invention, it is described hereinafter in relation to capacitor 13, but those skilled in the art will understand that other suitable electrical impedance devices may be used to achieve any desired voltage upsetting. For example, instead of a single capacitor 13, a resistor 13' might be mounted in passageways 11, 12, etc. as described below with reference to FIG. 5, or various combinations of resistors and capacitors in either series or parallel connected arrangements may be mounted with the unique supporting and connecting means of our invention to provide any desired upsetting of a given sparkgap assembly. The passageway 11 is sufficiently large to allow the capacitor 13 or a parallel capacitor and resistor coupling to be easily inserted into it but it has a small-enough diameter to maintain capacitor 13 or such a parallel impedance arrangement in a relatively fixed predetermined position within terminal 5a, as best seen in FIG. 3 of the drawing. Electrical circuit means in the form of an electrically conductive leaf spring 14 is positioned in a channel 15 formed in the upper surface of insulating plate member 2. In this embodiment of the invention, the width of channel 15 is sufficient to allow the leaf spring 14 to be compressed by electrode 4 when the component parts of sparkgap assembly 1 are in operative position, but is narrow enough to prevent the spring 14 from being rotated in a plane parallel to plate member 2 through an angle of more than a few degrees, as shown in FIGS. 2 and 3. Accordingly, leaf spring 14 simultaneously provides good electrical conductance from the upper conductive terminal 13a of capacitor 13 and, simultaneously, resiliently biases the bottom terminal 13b of capacitor 13 into electrically conducting relation with the sparkgap-forming terminal portion 5a of electrode 5.

The capacitance of capacitor 13 is selected so that the very high-frequency voltages of the type accompanying an overvoltage surge result in substantial capacitive current flow through capacitor 13. At the same time, the capacitance value of capacitor 13 must be such that at normal line frequencies very low capacitive currents flow through capacitor 13. Therefore, the voltage distribution of sparkgap assembly 1 will be "upset" on high-frequency impulses and remain comparatively uniform at normal line frequencies. Thus, it will be appreciated that for various applications of sparkgap assembly 1 the value of capacitor 13 should be varied. A significant feature of our invention is that the simplified capacitor mounting and electrical connecting means it affords make it a simple matter to exchange capacitors of different ratings. Also, it will be apparent that our invention provides another important advantage insofar as one or more of the sparkgaps of a multigap sparkgap assembly can be readily shunted by utilizing one or more capacitances in the plural passageways 11, 12 etc. Of course, in the two-gap embodiment of the invention depicted in FIGS. 1-3, only one capacitor 13 is utilized because it would be undesirable to essentially short circuit both sparkgaps 4a-5b and 5a-6a; however, if additional sparkgaps were inserted in series with these two sparkgaps of assembly 1, then it might be desirable to provide capacitance shunting means for two or more of the gaps to properly "upset" sparkgap assembly 1 for a given protective function. It will be noted that in the embodiment of the invention depicted in FIGS. 1-3 the longitudinal axis of passageway 11 is positioned concentrically over the cup-shaped terminal portion 5a of electrode 5 so that the strike over distance between the generally flat portion of electrode 4 and any portion of electrode 5 is always substantially greater than the sparkover distance of sparkgap 4a-5b.

In the operation of the embodiment of our invention depicted in FIGS. 1-3, the sparkgap assembly 1 will normally be positioned on a block of nonlinear resistance valve material, such as block 16, and mounted within a lightning arrester housing either by itself or in series with other sparkgap assemblies and pieces of nonlinear resistance valve material (not shown). Within such an arrester, suitable circuit means are provided to electrically connect the block of valve material 16 to a ground potential terminal and to connect terminal plate 8 to an electrical circuit that is to be protected from over voltage surges by the operation of the arrester. Assuming such connections have been made, when a high-frequency voltage surge of predetermined value, such as a lightning impulse, is impressed on end terminal 8 the voltage across sparkgap 4a-5b will be low and most of the voltage will appear across sparkgap 5a-6a because the capacity of plate 3 in combination with electrodes 5 and 6 is much less than the capacity of capacitor 13. Thus, sparkgap 5a-6a will sparkover first followed immediately by sparkover of sparkgap 4a-5b. After the initial high-frequency surge is discharged, the lower frequency follow current will flow through sparkgaps 4a-5b and 5a-6a creating a dual horngap effect in the sinuous path from electrode 4 through electrode 6 to end plate 9. Accordingly, the arcs formed in sparkgaps 4a-5b and 5a-6a are rapidly lengthened to enable sparkgap assembly 1 to reseal the current path to ground.

Now that the structure and operation of one embodiment of our invention has been described, reference is made to FIGS. 4, 5 and 6, which illustrate a second embodiment of an end terminal plate that is adapted for use with a sparkgap assembly having insulating plates and an intermediate electrode similar to the plates 2 and 3 and electrode 5 of the embodiment of the invention described above with reference to FIGS. 1-3. Since it will be readily apparent to those skilled in the art that the end plate 17 depicted in FIGS. 4-5 can be substituted for the combined end plates 8 and 9 and end electrodes 4 and 6 to form a sparkgap assembly similar to assembly 1, only the unique features of terminal plate 17 will be discussed without reiterating the other component parts of such an assembly. Accordingly, it can be seen that terminal plate 17 comprises a generally U-shaped member having a generally flat base portion 17d with three integral legs 17a, 17b and 17c extending outward from one side thereof. It should be noted that leg 17b is disposed in a plane below that of 17a and 17c in order to provide the proper horngap effect between electrode leg 17b and the next intermediate electrode similar to electrode 5 of FIG. 1. A cup-shaped terminal portion 18 is formed in central leg 17b to provide the sparkover terminal of a sparkgap, in the manner that the cup-shaped terminal portion 4a on electrode 4 does in the embodiment of the invention described with reference to FIG. 1. Within the area of the terminal plate 17 defined by an extension of the edges of central leg portion 17b across its base portion 17d, an integral resilient tongue 19 is formed by stamping a U-shaped arc in the electrode 17 and bending the tongue 19 so that its outer end normally rests in a plane below the generally flat plane of electrode 17, as best seen in FIG. 5. Therefore, when end electrode 17 is mounted in operative position on one end of a sparkgap assembly over an insulating plate such as plate 2 of the FIG. 1 embodiment of the invention, tongue 19 is in electrical contact with one terminal of a capacitor like 13, also designated in FIG. 5 as capacitor 13, and with a parallel resistor 13' to bias these elements into conducting relationship with the cup-shaped terminal portion of the intermediate electrode positioned under the other terminal of capacitor 13 and resistor 13'. It should be understood that capacitor 13 and resistor 13' in FIG. 5 would be mounted in the same manner as capacitor 13 in the embodiment of the invention shown in FIG. 3.

Of course, aside from the particular electrical connecting means and capacitor biasing function afforded by integral tongue 19, a sparkgap assembly constructed with the end electrode plate 17 of our invention will operate in substantially the same manner as the embodiment of the invention discussed above with reference to FIGS. 1-3, therefore, this sequence of operation need not be repeated.

It will be apparent to those skilled in the art that various additional modifications and embodiments of our invention may be made without departing from the spirit of the invention and all such variations are intended to be encompassed within the true spirit and scope of the following claims. For example, it will be apparent that rather than utilizing a leaf spring similar to leaf spring 14 other resilient conductive arrangements might be utilized to afford the capacitor supporting and electrical connecting means taught by our invention.

What we claim as new and desire to secure by letters patent of the United States is:

1. A sparkgap assembly for a surge voltage arrester comprising a plurality of stacked insulating plate members, means defining an aperture through each of said plate members, a plurality of sparkgap electrodes mounted respectively adjacent opposite sides of said plate members over said apertures thereby to form a sparkgap in each of said apertures between adjoining electrodes, an impedance device, electrical circuit means connecting said impedance device in shunt relation with one of said sparkgaps, means spaced apart from said aperture defining a passageway through the plate member separating the electrodes forming said one sparkgap, said impedance device being mounted in said passageway and maintained in a predetermined relatively fixed position by the walls thereof.

2. A sparkgap assembly as defined in claim 1 wherein said passageway is longer than the length of said one sparkgap thereby to prevent sparkover of said passageway when a surge voltage is discharged through the sparkgap assembly.

3. A sparkgap assembly as defined in claim 1 including a resistor mounted in said passageway and electrically connected in shunt relationship with said impedance device.

4. A sparkgap assembly as defined in claim 1 wherein said circuit means comprises an electrically conductive spring that is resiliently compressed between said impedance device and one of the electrodes forming said one sparkgap when assembled in operative position thereby to form a conductive circuit between said one electrode and one terminal of said impedance device and to resiliently bias a second terminal of said impedance device into conductive relationship with the other electrode forming said one sparkgap.

5. A sparkgap assembly as defined in claim 4 wherein said spring is a leaf spring, and including holding means for retaining said leaf spring in its operative position, said holding means comprising means defining an elongated channel in the surface of the insulating plate member immediately adjacent the leaf spring, said channel being wide enough to allow the spring to be compressed without being retarded in such movement by the sidewalls of the channel but being narrow enough to prevent the spring from being rotated more than 45°.

6. A sparkgap assembly as defined in claim 1 wherein each of said electrodes comprises a generally flat portion and a cup-shaped terminal portion the outer surface of which is positioned in one of said apertures to define one side of the sparkgap in said aperture, said passageway being positioned over the inner surface of one of said cup-shaped terminal portions thereby to maintain said impedance device in position within said one cup-shaped terminal portion.

7. A sparkgap assembly as defined in claim 6 wherein said passageway is concentrically positioned with respect to the cup-shaped terminal portion over which it is located and the open end of said passageway adjacent said one cup-shaped terminal portion is smaller than the upper rim of the cup-shaped terminal portion, thereby to assure a greater electrical sparkover length between the electrodes adjacent said impedance device through the passageway than through the sparkgap defined by these two electrodes.

8. A sparkgap assembly as defined in claim 1 wherein said electric circuit means comprises an integral resilient tongue on one of the electrodes forming said one sparkgap, said tongue being resiliently biased toward said impedance device and loaded in compression by contact with it when assembled in operative position thereby to form a conductive circuit between said one electrode and one terminal of said impedance device and to resiliently bias a second terminal of said impedance device into conductive relationship with the other electrode forming said one sparkgap.

9. A sparkgap assembly as defined in claim 8 wherein the electrode having said integral tongue thereon comprises a base portion having three legs extending outwardly from one side thereof, said tongue being positioned in the area of said electrode including the middle leg and the part of said base portion encompassed by an extension of the edges of said middle leg therethrough.

10. A sparkgap assembly as defined in claim 9 wherein at least the outer end of said middle leg is positioned in a plane closer to the center of said assembly than a common plane through the other two legs whereby any flat conductive member placed on said two legs is prevented from electrically contacting said outer end of the middle leg.

11. A sparkgap assembly as defined in claim 9 wherein the electrode having said integral tongue thereon is mounted adjacent the outer surface of an end plate member in said stacked assembly of plate members.

12. A sparkgap assembly as defined in claim 1 wherein said impedance device is a capacitor.

13. A sparkgap assembly for a surge voltage arrester comprising a plurality of stacked insulating plate members, means defining an aperture through each of said plate members, a plurality of sparkgap electrodes mounted respectively adjacent opposite sides of said plate members over said apertures thereby to form a sparkgap in each of said apertures between adjoining electrodes, means spaced apart from said aperture defining passageways through a predetermined number of said plate members, a plurality of electrical impedance devices, at least one of said impedance devices being mounted respectively in at least two of said passageways and maintained in a relatively fixed position by the walls thereof, and electrical circuit means connecting each of said impedance devices in shunt relation respectively with one of said sparkgaps.

14. A sparkgap assembly as defined in claim 13 wherein at least one of said impedance devices is a capacitor and another of said impedance devices is a resistor.

15. A sparkgap assembly as in claim 14 wherein at least one capacitor and one resistor are mounted in one of said passageways and electrically connected in parallel with one another.

16. A sparkgap assembly as in claim 15 including at least one additional impedance device electrically connected in series with said parallel-connected capacitor and resistor, said additional impedance being mounted in a separate passageway and electrically connected in shunt relationship with another sparkgap of the assembly.

* * * * *